US008381251B2

(12) United States Patent
Lindberg

(10) Patent No.: US 8,381,251 B2

(45) Date of Patent: Feb. 19, 2013

(54) METHOD OF RECEIVING INFORMATION

(75) Inventor: Anders Lindberg, Åkersberga (SE)

(73) Assignee: TB Invent AB, Sollentuna (SE)

( * ) Notice: Subject to any disclaimer, the term of this patent is extended or adjusted under 35 U.S.C. 154(b) by 2246 days.

(21) Appl. No.: 09/960,351

(22) Filed: Sep. 24, 2001

(65) Prior Publication Data

US 2002/0080895 A1 Jun. 27, 2002

Related U.S. Application Data

(63) Continuation of application No. PCT/SE00/00541, filed on Mar. 22, 2000.

(30) Foreign Application Priority Data

Mar. 24, 1999 (SE) ...................................... 9901070

(51) Int. Cl.
*H04N 7/20* (2006.01)

(52) U.S. Cl. .......................... 725/68; 725/140; 455/12.1

(58) Field of Classification Search .............. 725/68–71, 725/100, 151, 131–134, 139–142; 455/12.1, 455/437–456, 427–430
See application file for complete search history.

(56) References Cited

U.S. PATENT DOCUMENTS

| | | | | |
|---|---|---|---|---|
| 5,345,602 | A | 9/1994 | Wiedemann et al. | |
| 5,483,690 | A | 1/1996 | Schroder | |
| 5,568,135 | A * | 10/1996 | Shinozaki | 340/3.43 |
| 5,671,219 | A * | 9/1997 | Jensen et al. | 370/280 |
| 6,094,427 | A * | 7/2000 | Yi | 370/331 |
| 6,122,759 | A * | 9/2000 | Ayanoglu et al. | 714/57 |
| 6,161,013 | A * | 12/2000 | Anderson et al. | 455/437 |
| 6,169,881 | B1 * | 1/2001 | Astrom et al. | 455/12.1 |
| 6,393,047 | B1 * | 5/2002 | Popovic | 375/140 |
| 6,477,163 | B1 * | 11/2002 | Miller | 370/347 |
| 6,532,365 | B1 * | 3/2003 | Anderson et al. | 455/437 |
| 6,543,813 | B1 * | 4/2003 | Koberlein | 285/148.19 |
| 6,643,813 | B1 * | 11/2003 | Johansson et al. | 714/748 |
| 6,661,996 | B1 * | 12/2003 | Wiedeman et al. | 455/12.1 |
| 6,724,813 | B1 * | 4/2004 | Jamal et al. | 375/219 |

FOREIGN PATENT DOCUMENTS

EP 0 873 034 A2 10/1998

* cited by examiner

*Primary Examiner* — Annan Shang

(74) *Attorney, Agent, or Firm* — Birch, Stewart, Kolasch & Birch, LLP

(57) ABSTRACT

A method and device for test receiving alternative reception frequencies without interrupting the reception of specific user terminating information by use of only one reception chain. In certain information streams, such as that of a terrestial digital video broadcasting system (DVB-T), there is no provisions for time slots when an alternative reception frequency can be test received without interrupting flow of information. According to the invention the continuous flow of information is classified into specific user terminating information which is desired by the receiver in question, or user of, and into other information. The behavior of the specific user terminating information is used to determine when an interruption of the other information can occur for test receptions of alternative reception frequencies without interrupting the reception of the specific user terminating information.

37 Claims, 3 Drawing Sheets

METHOD OF RECEIVING INFORMATION

This application is a Continuation of PCT International Application No. PCT/SE00/00541 filed on Mar. 22, 2000, which was published in English and which designated the United States and on which priority is claimed under 35 U.S.C. §120, the entire contents of which are hereby incorporated by reference.

TECHNICAL FIELD

The present invention relates generally to a method, in a radio frequency receiver, especially digital video broadcasting radio frequency receivers, of test receiving alternative reception frequencies.

BACKGROUND

A mobile radio receiver, such as a FM car radio, has to change reception frequency when moving from one broadcasting area/region covered by one transmitter to another broadcasting area/region covered by another transmitter. To avoid cross interference, adjacent FM-radio broadcasting transmitters have to transmit with different frequencies. To be able to switch to the correct new reception frequency, the receiver will usually perform test receptions of possible alternative reception frequencies to thereby determine which one to switch to. To avoid irritating interruptions of the audio reception, test receptions of alternative reception frequencies will preferably take place when the received audio level is low. This will in most cases ensure that a listener does not notice these short test receptions during short silences in speech or music. When the receiver has determined which reception frequency to change to, a switch can be performed when the audio level is low. A listener will then in most cases not even notice that a change in reception frequency has taken place.

To increase the audio quality a new digital audio broadcasting (DAB) system has emerged. DAB uses coded orthogonal frequency division multiplexing (COFDM) modulation and was primarily intended as a single frequency network (SFN). In a single frequency network a DAB-radio receiver does not have to switch reception frequency when travelling between regions covered by different transmitters as they all transmit the same programmes/information with the same frequency. DAB has also made it possible to easily transfer information other than audio-information in a digital format to one or more end users.

Even though the DAB system was primarily intended as a single frequency network, there has evolved DAB regions with different transmission frequencies, each of which is possibly a SFN with a plurality of transmitters. So even in a DAB system there is a need to be able to switch/changeover reception frequency without the involvement of the listener or information end user. However, due to the continuous nature of the digital data stream the receiver can not be used for test reception of an alternative reception frequency without interrupting the user data transmission. A DAB system can loose some sub-carriers, due to example fading, some of the time but the data stream cannot be cut off for a time period necessary for a test reception of alternative frequencies. One solution to this is to use the available time during a NULL symbol to test receive alternative reception frequencies. This is possible due to the mostly available transmitter identification information (TII) transmitted with a low power level during at least some NULL symbols.

A new broadcasting system, digital video broadcasting (DVB), has emerged which is primarily intended as a video broadcasting system. DVB just as DAB can also be used to transfer digital information with an arbitrary content to an end user. The terrestial version of DVB, i.e. DVB-T, just as DAB, is intended as a single frequency network using a orthogonal frequency division and multiplex (OFDM) method. However, unlike DAB, DVB-T does not have the possibility to test receive alternative reception frequencies during a NULL symbol. A possible solution would be to use two reception chains, i.e. using two tuners, letting one be used to receive a data stream from a currently used reception frequency while the other tuner is used for test receptions of alternative reception frequencies. Unfortunately this will double the necessary hardware and thus the needed space, power and costs.

SUMMARY

An object of the invention is to define a method for test receiving alternative reception frequencies without the need of doubling the reception chain in systems for wireless data communication, for example, a digital video broadcasting system, especially a terrestial digital video broadcasting system (DVB-T).

Another object of the invention is to define a receiver for a system for wireless data communication, especially a terrestial digital video broadcasting system (DVB-T), which receiver can test receive alternative reception frequencies without any perciptible interrupts of specific user terminating information.

The above mentioned objects are achieved in accordance with the invention by a method and device for test receiving alternative reception frequencies without interrupting the reception of specific user terminating information by use of only one reception chain. In certain information streams with a continuous flow of information, such as that of a terrestial digital video broadcasting system (DVB-T), there is no provisions for time slots when an alternative reception frequency can be test received without interrupting the flow of information. According to the invention the continuous flow of information is classified into specific user terminating information which is desired by the receiver in question, or user thereof, and into other information. The behaviour of the specific user terminating information is used to determine when an interruption of the other information can occur for test receptions of alternative reception frequencies without interrupting the reception of the specific user terminating information.

The aforementioned objects are also achieved according to the invention by a method of test receiving alternative reception frequencies in a receiver receiving a continuous flow of information at a first reception frequency. The continuous flow of information comprises user terminating information. The user terminating information will usually comprise plurality of different specific user information destined for a plurality of different users. Some of the specific user terminating information can be aimed at different group of users. The receiver comprises an information transfer routine extracting a flow of specific user terminating information from the received continuous flow of information, i.e. the information transfer routine extracts user terminating information that is desired by and/or addressed to the receiver/user in question, i.e. specific user terminating information. According to the invention the method comprises a number of steps. In a first step an interruption in the flow of specific user terminating information is determined. In a second step the interruption is evaluated if it will be of an adequate length of time, and will generate a positive response if it is evaluated that the interruption will be of an adequate length of time. In a third step the reception frequency of the receiver is changed from the first reception frequency to an alternative reception frequency if the evaluation has generated a positive response. In a fourth step the alternative reception frequency is test received. The test reception can preferably involve measuring and/or receiving one or more parameters of the test received frequency, such as signal quality and/or information on available transmission bandwidth, which can be used for evaluating the frequency. And in a fifth step the reception and extraction of the flow of specific user terminating information is once again enabled.

The receiver can in some embodiments, advantageously be receiving the continuous flow of information of a terrestial digital video broadcasting (DVB-T) transmission or of a digital audio broadcasting (DAB) transmission.

The second step of evaluating the interruption can preferably comprise two substeps. The first substep of the second step determines a probability that the interruption will be of an adequate length of time. The second substep of the second step determines if the probability determined in the first substep of the second step is larger than a predetermined threshold value, and if it is determined that the probability is larger than the predetermined threshold value then the second step evaluates that the interruption will be of an adequate length of time. An adequate length of time of an interruption is preferably in most versions at least equal a total time of one test reception and one frequency change.

The first step of determining an interruption in the flow of specific user information can in some versions of the method be done by prediction of an expected interruption, in the receiver, of the flow of specific user information. In other versions of the method it can preferably be determined in the first step that an interruption in the flow of specific user information has occurred by an indication by the information transfer routine, occurred after a predetermined period of inactivity of the flow of specific user information, or occurred after a timeout signal is generated by the information transfer routine. One or more of these criteria can, if desired, be combined if they are not contradictory.

The fifth step of enabling reception and extraction of the flow of specific user terminating information can in some versions of the method or at times determined by predetermined criteria, preferably be performed after the fourth step of test receiving the alternative reception frequency has completed. In other versions of the method or at other time intervals the fifth step of enabling reception and extraction of the flow of specific user terminating information can preferably be performed after a predetermined time interval from the point in time of the first step of changing the reception frequency from the first reception frequency to an alternative frequency, be performed after a predicted available time period, be performed after the information transfer routine has requested more information, be performed after a predetermined period of time after the information transfer routine has requested more information, be performed after the information transfer routine is activated, or be performed after a predetermined period of time after the information transfer routine is activated. However, it should be noted that the latter versions of the fifth step do not guarantee the integrity of the fourth step, i.e. the test reception of the alternative reception frequency might not be finished, for example due to an unexpectedly slow test reception, before the method continues with the fifth step.

In some versions of the method, the method further comprises the additional step of determining a list of alternative frequencies. If the method comprises the additional step of determining a list of alternative frequencies then after the fourth step of test receiving the alternative reception frequency, and before the fifth step, the method can advantageously further comprise two further steps. The first further step changes the reception frequency of the receiver from an alternative reception frequency to a further alternative frequency from the list of alternative frequencies. The second further step test receives the further alternative frequency. In some versions of the method with the two further steps, the first and second further steps are repeated by changing to alternative frequencies from the list of determined alternative frequencies, and preferably, until all the frequencies from the list of determined alternative frequencies are test received.

Advantageously the method further comprises the step of evaluating the test reception or test receptions based on one or more parameters of the test received alternative frequency or frequencies.

The method can in some versions in the fifth step of enabling reception and extraction of the flow of specific user terminating information comprise the substep of changing the reception frequency to the first reception frequency.

In some versions of the method, the method further comprises an additional step of initiating a handover to an alternative frequency. Preferably the step of initiating a handover comprises two handover substeps. The first handover substep determines a handover frequency to which frequency the reception should be changed. The second handover substep changes reception frequency of the receiver to the handover frequency. In some versions of the method the additional step of initiating a handover further comprises another two substeps, a third and a fourth handover substep, which are preferably executed before the second handover substep. The third handover substep determines a further interruption in the flow of specific user terminating information. The fourth handover substep evaluates the further interruption if it will be of an adequate length of time, and generates a positive response if it is evaluated that the interruption will be of an adequate length of time, and in the second handover substep of changing reception frequency to the handover frequency only changing reception frequency of the receiver to the handover frequency if the evaluation of the further interruption has generated a positive response. Preferably the fourth handover substep of evaluating the further interruption comprises two additional substeps, a first and a second additional substep. The first additional substep determines a probability that the further interruption will be of an adequate length of time. The second additional substep determines if the determined probability of the first additional substep is larger than a predetermined threshold value, and if it is determined that the probability is larger than the predetermined threshold value then it is evaluated that the further interruption will be of an adequate length of time. Preferably an adequate length of time of a further interruption is at least equal a total time of one frequency change.

In other versions of the method the fifth step of enabling reception and extraction of the flow of specific user terminating information comprises a substep. The substep of the fifth step changes the reception frequency to one alternative reception frequency, and thus initiates a handover from the first reception frequency to the alternative reception frequency in question. In still other versions of the method the substep of the fifth step initiates a handover from the first reception frequency to the alternative reception frequency that was test received most recently.

One or more of the features of the above described different methods according to the invention can be combined in any desired manner, as long as the features are not contradictory.

The aforementioned objects are also achieved according to the invention by a receiver being arranged to receive a continuous flow of information at a first reception frequency. The continuous flow of information comprises user terminating information. The receiver comprises an information transfer routine arranged to extract a flow of specific user terminating information from the received continuous flow of information, i.e. the information transfer routine extracts user terminating information that is desired by and/or addressed to the receiver/user in question, i.e. specific user terminating information. The receiver is further arranged to be able to test receive alternative reception frequencies. According to the invention, to enable test receptions of alternative reception frequencies without disturbing the reception of the flow of specific user terminating information, the receiver further comprises first determining means, first evaluation means, first changing means, test means, and enabling means. The first determining means is arranged to determine an interruption in the flow of specific user terminating information. The first evaluation means is arranged to evaluate if the determined interruption will be of an adequate length of time. The first changing means is arranged to change reception frequency of the receiver from the first reception frequency to an alternative reception frequency if it is evaluated in the first evaluation means that the interruption is of an adequate length of time. The test means is arranged to test receive the alternative reception frequency when the first changing means has changed reception frequency to the alternative reception frequency. The test reception can preferably involve measuring and/or receiving one or more parameters of the test received frequency, such as signal quality and/or information on available transmission bandwidth, which can be used for evaluating the frequency. And the enabling means is arranged to enable reception and extraction of the flow of specific user terminating information. The receiver can, for example in some embodiments, advantageously be arranged to receive the continuous flow of information of a terrestial digital video broadcasting (DVB-T) transmission or of a digital audio broadcasting (DAB) transmission.

In some embodiments of the receiver the first evaluation means further comprises second and third determining means. The second determining means is arranged to determine a probability that the interruption will be of an adequate length of time. The third determining means is arranged to determine if the probability is larger than a predetermined threshold value, and if it is determined that the probability is larger than a predetermined threshold value then it is evaluated in the first evaluation means that the interruption will be of an adequate length of time. An adequate length of time of an interruption is preferably at least equal a total time of one test reception and two frequency changes.

In some embodiments the enabling means comprises a second changing means which is arranged to change the reception frequency, preferably when the test means has test received the alternative reception frequency, to the first reception frequency.

The receiver can in some embodiments further comprise handover means arranged to initiate a handover from the first reception frequency to an alternative frequency.

In some embodiments the enabling means comprises handover means arranged to initiate a handover from the first reception frequency to the alternative reception frequency that was test received most recently.

The features of the above described different embodiments of a receiver according to the invention can be combined in any desired manner, as long as no conflict occurs.

By providing a receiver and a method of a receiver for test receiving alternative reception frequencies without the need for a second reception chain allows costs, power and space requirements to be lowered and reliability to be improved. By classifying the information comprised in the continuous flow into specific user terminating information demanded and/or addressed to the receiver and/or end user associated with the receiver and into other information not desired or addressed to the receiver and then using the characteristics of the specific user terminating information it is possible to test receive alternative reception frequencies without interruptions of the specific user terminating information. The characteristics of the specific user terminating information flow is that it is clustered, i.e. sent in lumps, usually of a well defined size or comprises an indication of the end.

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the method and device according to the invention, some examples of its use will now be described in connection with FIGS. 1 to 4.

Figure 1:
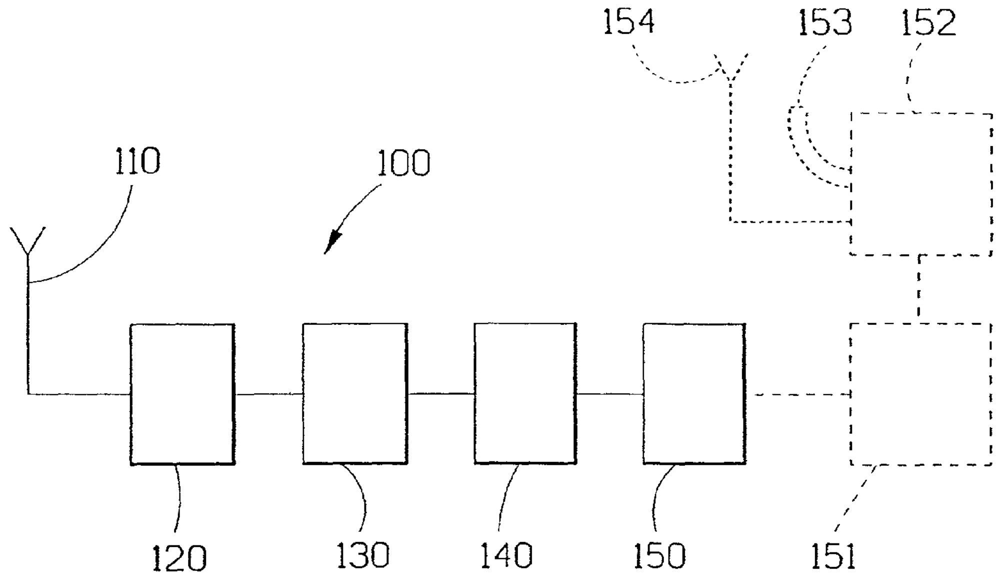
FIG. 1 shows a DVB-T receiver according to the invention.

FIG. 1 shows a receiver 100 according to the invention, which is preferably a digital video terrestial broadcasting (DVB-T) receiver. The receiver 100 comprises an antenna 110 or means to connect an external antenna, a preamplifier/tuner 120, demodulation means 130, digital signal processing means 140, and one or more input/output (I/O) interface means 150. The receiver 100 might optionally comprise or be connected to a specific user device 151 such as a computer, for example a personal computer operating one or more programs for, for example, internet access. Such a user device 151 can be connected to a secondary communication interface 152 to obtain a return communication channel either wireless via an antenna 154, for example a mobile telephone, or by wire 153, for example a stationary telephone network.

The receiver 100 receives a continuous flow of information/data via the antenna 110. Signals picked up by the antenna 110 will preferably first of all be amplified in the preamplifier/tuner 120 which preferably comprises mixing means for transposing the received signals to an intermediate frequency (IF). The heart of the receiver 100 will process its signals in a digital form and if the preferably quadrature demodulator 130 is realised in digital form the quadrature demodulator 130 will have an analog to digital converter (A/D converter) at the input or if the quadrature demodulator 130 is realised in analog form then it will have an analog to digital converter at its output. The processing according to the invention is performed digitally by the digital signal processing means 140 preferably in conjunction with the ordinary digital signal processing that is required for extracting the received program/information in a robust manner.

According to the invention, test receptions of alternative reception frequencies are performed when it is evaluated that an interruption in the flow of specific user terminating information has a sufficient duration for the receiver to be able to perform a test reception. Preferably the evaluation is performed by determining a probability that the interruption will be of sufficient duration. Then it is determined if the determined probability is larger than a predetermined threshold value, and if it is determined that the probability is larger than a predetermined threshold value then it is evaluated that the interruption will be of sufficient duration. A sufficient duration of an interruption is preferably at least equal a total time of one test reception and two frequency changes. When it is evaluated that there exists an interruption of sufficient duration the preamplifier/tuner 120 is switched from a first reception frequency to an alternative reception frequency. There should then elapse enough time for all circuits to stabilize. Thereafter the digital signal processing 140 performs the test reception of the alternative reception frequency which test reception can involve measurements of one or more parameters such as signal strength, signal quality, bit error rate of the decoded signal, or system parameters of the alternative reception frequency such as the maximum available transmission bandwidth and/or the transmission load or availability. Finally the preamplifier/tuner 120 is switched back to the first reception frequency. There should then preferably elapse enough time for all circuits to stabilize before ordinary reception is continued. The procedure is preferably repeated with different alternative reception frequencies, preferably as many as possibly before a switch back to the first reception frequency is performed, and thereafter at a suitable time before a handover they are evaluated. If the evaluation determines that a change in reception frequency is motivated then preferably a handover procedure is initiated. The evaluation can in some cases be performed directly after each test reception, and if motivated a handover to an alternative reception frequency is performed instead of switching back to the first reception frequency.

The receiver 100 will comprise some sort of information transfer routine, preferably at least in part implemented in the digital signal processing 140. If a user is using a computer 151 for viewing internet pages, then the information transfer routine can preferably in part be a transmission control protocol (TCP) routine. The TCP can signal when a complete information package, for example a complete web-page, has been received. There will then be a delay caused by the user before he/she determines it is time to request a new page. The method according to the invention makes use of this and other delays, such as the delays from a request of information to delivery, to test receive one or more alternative reception frequencies. If the delay from a request of information to delivery is to short to test receive an alternative reception frequency then according to the invention in some embodiments the request can be delayed to allow enough time for a test reception of an alternative reception frequency.

Figure 2:
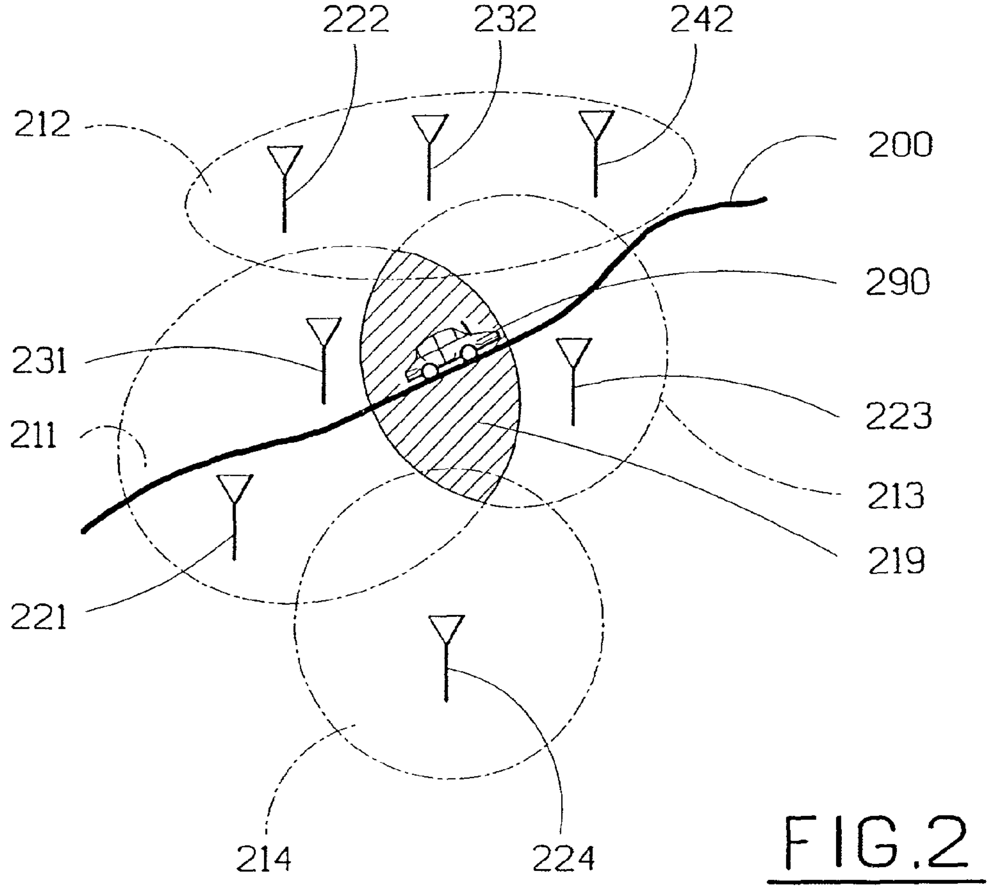
FIG. 2 shows a frequency coverage map.

Test receptions of alternative reception frequencies becomes essential for mobile applications and can also be useful in geographically stationary applications between broadcasting regions with different broadcasting frequencies. FIG. 2 shows a frequency coverage map over four different broadcasting regions 211, 212, 213, 214, each region broadcasting with a different frequency. Each broadcasting region 211, 212, 213, 214, has at least one transmitter 221, 231, 222, 232, 242, 223, 224. A first broadcasting region 211 comprises two transmitters 221, 231, to be able to cover the whole first region 211. The two transmitters 221, 231, of the first region 211 transmit at the same frequency and thereby takes advantage of the DVB-T system. A second broadcasting region 212 comprises three transmitters 222, 232, 242, to cover the whole second region 212. The number of necessary transmitters can, for example, depend on the geography of the region or transmitter output power level. The first and second regions 211, 212, are thus single frequency networks on a small scale.

Each one of the third and fourth broadcasting regions 213, 214, comprises a single respective transmitter 223, 224. These broadcasting regions 213, 214 can be of the DVB-T, or of another type, such as digital audio broadcasting (DAB). The invention is not restricted to what type of broadcasting system a mobile receiver enters or a stationary receiver is in the vicinity of, but only that the currently received information is transmitted from a system that transmits a continuous flow of information, such as DVB-T. This specific embodiment deals with performing test receptions of alternative frequencies when receiving information from a DVB-T system. It will be assumed in the following that all of the broadcasting regions 211, 212, 213, 214, are of the DVB-T type. Further it will be assumed that at least two of the broadcasting regions 211, 213, (the first and third 211, 213) broadcast at least one common information channel, the information channel being the one that our mobile receiver 290 is receiving when travelling along a road 200 that goes through the first and third broadcasting regions 211, 213, in our example.

If the same information channel is not available, a receiver would preferably change to an alternative frequency that transmits the same type of information that is currently received and via a back/return channel inform an information provider that it should redirect the desired information to the new information channel. In these circumstances it would be preferable if the change to an alternative frequency is a bit more reluctant, i.e. the current frequency and therefore current information channel would be allowed to degrade a bit more before a change is performed than when the same information channel is available and a change back and forth can be performed without, for example, having to redirect the desired information between different information channels.

Test receptions of alternative frequencies are preferably done continuously when the receiver is not receiving user terminating information, but change to an alternative frequency will usually only be close at hand when a receiver is located in a region/intersection 219 between two or more broadcasting regions 211, 213, as is illustrated in FIG. 2. In some embodiments according to the invention, test receptions of alternative frequencies are only initiated/performed when there is a need for an alternative reception frequency, such as when the quality of the current reception frequency is degrading and falls below a predetermined threshold. According to the invention, test receptions of alternative frequencies are performed during intervals when there is an interruption of the flow of specific user terminating information, i.e. the information specifically desired by the end user in question.

Figure 3:
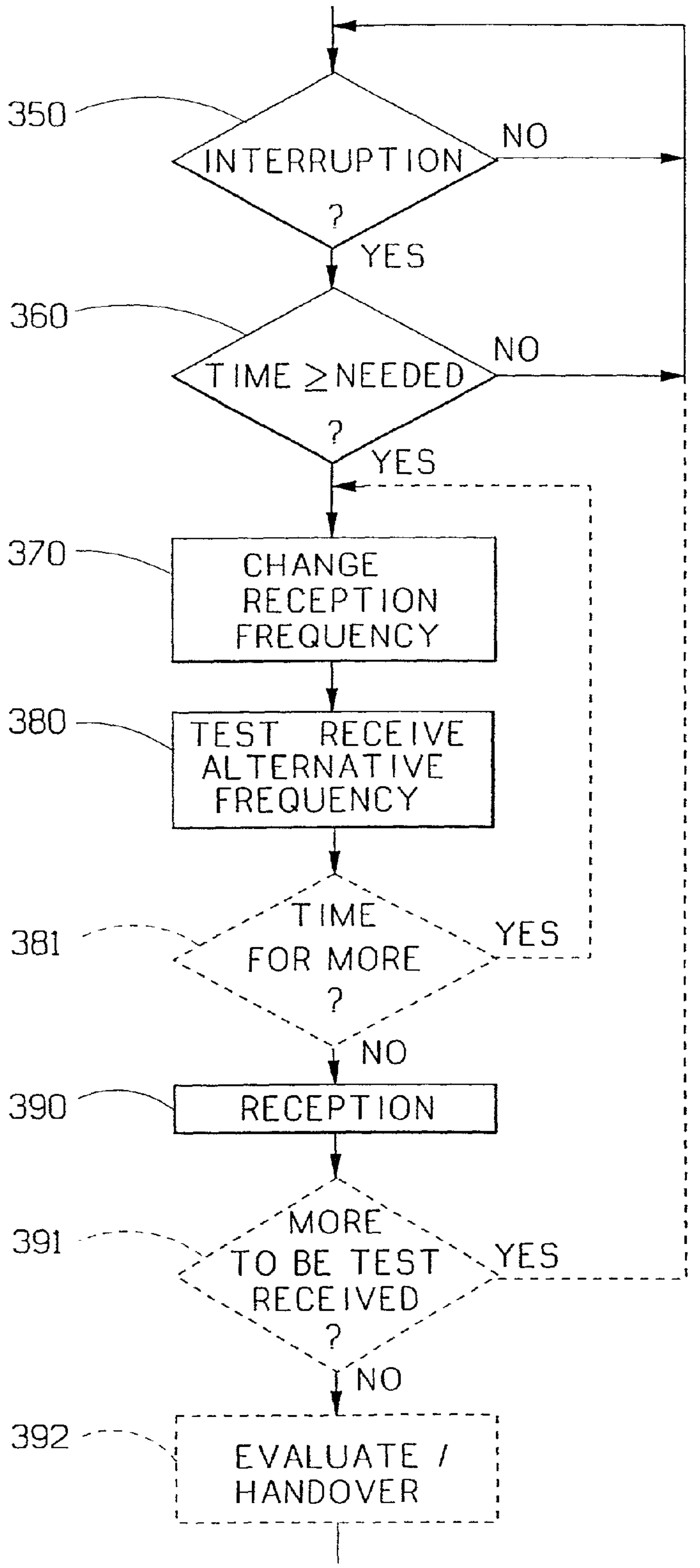
FIG. 3 shows a flow chart of how alternative reception frequencies are test received according to the invention.

FIG. 3 shows a flow chart of how alternative reception frequencies are test received according to the invention. The basic procedure according to the invention comprises five steps. The flow chart also shows a few additional steps that are optional. In a first basic step 350 is determined if there is an interruption in the flow of specific user terminating information. If there is no interruption, the step 350 just loops until there is one. There can be occasions where there is no interruption for long periods of time. During such a long period of time without a natural interruption there can arise a need for a handover which is triggered by, for example, a low signal/field strength or a high bit error rate of the decoded signal. When such a need arises, it is preferable to actively interrupt the flow of user terminating information, perform one or more test receptions of alternative frequencies if needed, possibly perform an evaluation of one or more test receptions, then perform a handover, and finally request the lost information again by for example demanding a resend.

In a second basic step 360 it is determined if the determined interruption is of sufficient duration. There should preferably be time for two reception frequency changes and time for the test reception itself and possibly also time for descrambling due to for example interleaving when returning to the first reception frequency. The determination can be based on a prediction based on a history of previous interruptions and/or a history/knowledge of the inherent delays in the system, e.g. the system delays from a demand of information until the information is transferred in the information flow. In other embodiments the determination can be based on a determination of a probability that the interruption will be of sufficient duration and thereafter a determination if the probability is larger than a predetermined threshold value, and if it is determined that the probability is larger than a predetermined threshold value then it is determined that the interruption will be of sufficient duration. If it is determined that the interruption is not of sufficient duration then the procedure returns to the first basic step 350 to find a new interruption. If, on the other hand, it is determined that the interruption is of sufficient duration then the procedure continues with the third basic step 370 which changes a currently received frequency, to an alternative reception frequency. The alternative reception frequency can, for example, come from a list of alternative reception frequencies which, for example, can come from information comprised in the flow of information of the first reception frequency. Thereafter in a fourth basic step 380, the alternative reception frequency is test received. The test reception preferably measures one or more parameters that define a quality measure of the received signal, such as signal/field strength of the alternative frequency or the bit error rate of the decoded signal. The test reception can also involve the reception of information received from the information channel of the alternative reception frequency providing information such as currently available transmission bandwidth, cost of bandwidth, predicted bandwidth availability, maximum available bandwidth, alternative reception frequencies, load, and/or load variations which can be used as parameters in an evaluation of the alternative reception frequency.

Subsequent to the test reception in the fourth basic step 380, there can optionally be a first optional step 381 in which it is determined if the interruption is of sufficient duration to test receive another alternative reception frequency. If there is sufficient time then the procedure goes back to the third basic step 370 for a change of reception frequency to a new alternative frequency. If there is not enough time to perform any more test receptions then the procedure continues with the fifth and last basic step 390. The fifth basic step 390 changes the reception frequency to a reception frequency for reception of the flow of specific user terminating information, which can be back to the original reception frequency or for example a handover to an alternative reception frequency. The procedure then optionally comprises another two optional steps, a second 391 and third 392 optional steps. The second optional step 391 determines if there are any more alternative reception frequencies to be test received before the third optional step 392, and if there is then the procedure continues with the first basic step 350. If there are no more alternative reception frequencies to be test received before the third optional step 392 or if a handover appear to be necessary, then the procedure continues with the third optional step 392. The third optional step 392 performs an evaluation of one or more, preferably all, of the test received alternative reception frequencies and determines if the currently received reception frequency should be kept or if a handover to a better alternative reception frequency should be performed. A step of evaluation can be performed at other places in the procedure, such as after the fourth basic step 380 of test receiving an alternative reception frequency. A handover to an alternative reception frequency is preferably performed during an interruption in analogy with that of a test reception according to the invention. However, in certain circumstances a handover must be performed immediately, i.e. the handover cannot wait for an interruption of the flow of user terminating information to occur.

Figure 4:
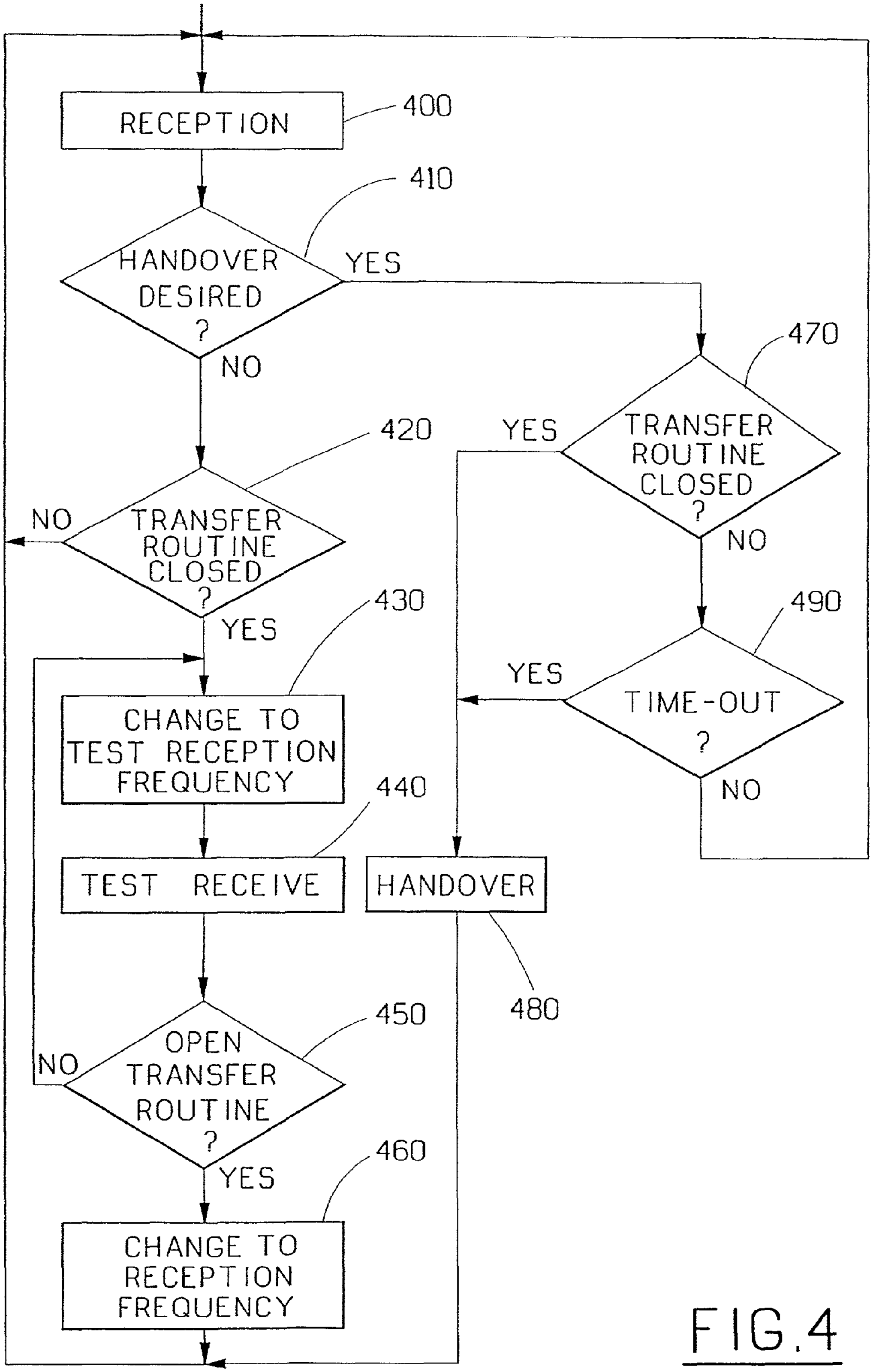
FIG. 4 shows a flow chart of a specific implementation of test receptions of alternative reception frequencies and a possible handover from a first reception frequency to an alternative reception frequency according to the invention.

FIG. 4 shows a flow chart of a specific implementation of test receptions of alternative reception frequencies and a possible handover from a first reception frequency to an alternative reception frequency according to the invention. The basic steps of the procedure according to the invention are shown above. The implementation can, for example, be a receiver receiving demanded internet pages as a flow of specific user terminating information. The information transfer routine that extracts this information from a continuous flow of information can, for example, be the transmission control protocol (TCP) or other protocols in the TCP/IP suite. In a first step 400 the receiver is tuned to a first reception frequency and receiving a continuous flow of information. A transfer routine is preferably extracting any flow of specific user terminating information, i.e. for example specific web/internet homepages, that an information consumer associated with the receiver has demanded. The continuous flow of information will comprise other information, for example internet access, demanded by other users and possibly information available to all receivers/users. If the receiver is mobile, or located in an area between a plurality of transmitters, then there will arise a need for changing reception frequency and possibly initiate a handover.

A second step 410 determines if there is a need for a handover or not. If no handover is desired immediately then in a third step 420 it is determined if the transfer routine is closed/inactive or not, i.e. is there an interruption in the flow of specific user terminating information, and if there is, is there time enough to perform two frequency changes, a test reception of an alternative reception frequency, and any other necessary processing. If a user has demanded an amount of information from, for example, internet and that information has been received, then the information routine will either close completely or go into an idle mode since it does not have to extract any more flow of specific user terminating information from the continuous flow of information. If the transfer routine is still active then the procedure continues with the first step 400. On the other hand if the transfer routine is closed/inactive then according to the invention, test receptions of alternative reception frequencies can be performed as long as the transfer routine is closed/inactive long enough for two frequency changes, a test reception, and any other necessary processing to take place. In such a case the procedure continues with the fourth step 430 and changes the current reception frequency to an alternative reception frequency. The alternative reception frequency is test received in the following fifth step 440, as previously described, acquiring one or more parameters characterizing the alternative reception frequency. After the test reception it is determined in a sixth step 450 if there is a demand or need to open/activate the transfer routine again? If it is determined that there is no need to open/activate the transfer routine for the moment, then the procedure preferably continues with the fourth step 430 with possibly another alternative test reception frequency. On the other hand, if it is determined that there is a demand or need to open/activate the transfer routine again, then the procedure continues with a seventh step 460 which changes the reception frequency to the reception frequency currently used for reception of the continuous flow of information. If the alternative reception frequency which was most recently test received is to be used as reception frequency then no change is needed. After the change of reception frequency the procedure continues with the first step 400.

If it is determined in the second step 410 that a handover is desired or necessary then the procedure continues with the eighth step 470. The eighth step 470 determines if the transfer routine is closed/inactive, i.e. is there an interruption in the flow of specific user terminating information and if there is, is there time enough to perform a handover. To which new reception frequency the handover changes depends on an analysis of previously performed test receptions. Which test receptions are used in the analysis will, for example, depend on the age structure of the test receptions and their quality characteristics. If no, only very few, or only old test receptions are available then it is advantageous if test receptions of alternative reception frequencies are performed before a handover to a new reception frequency is performed. If the transfer routine has closed/is inactive then the procedure continues with a ninth step 480 which performs the handover and then continues with the first step 400. On the other hand if the transfer routine is not closed/inactive at the eighth step 470 then the procedure continues to a tenth step 490 to determine if the transfer routine has a time-out to thereby interrupt an information transfer for a necessary handover, e.g. the transfer routine can be waiting for information that possibly will never arrive. If there has not been a time-out then the procedure continues with the first step 400. On the other hand if there has been a time-out, then the transfer routine is forced into a closed/inactive mode and the procedure continues with the ninth step 480.

The present invention can be put into apparatus-form either as pure hardware, as pure software or as a combination of hardware and software. If the method according to the invention is realised in the form of software, it can be completely independent or it can be one part of a larger program. The software can suitably be located in a general purpose computer or in a dedicated computer.

As a summary the invention can be described as utilizing the natural breaks that occur in an information flow which is dedicated to a user. By detecting when these breaks/interruptions occur and with knowledge of or prediction of the length of these breaks/interruptions it is possible with only one reception chain to test receive alternative reception frequencies without interrupting the received flow of user dedicated information.

The invention is not limited to the embodiments described above but may be varied within the scope of the appended patent claims.

| | |
|---|---|
| FIG. 1 | |
| 110 | antenna |
| 120 | preamplifier/tuner |
| 130 | demodulation |
| 140 | digital signal processing |
| 150 | I/O interface, video, audio, data |
| 151 | user device/computer |
| 152 | secondary communication interface for back channel |
| 153 | wire connection |
| 154 | antenna for wireless connection |
| FIG. 2 | |
| 200 | road |
| 211 | frequency 1 coverage |

-continued

| | |
|---|---|
| 212 | frequency 2 coverage |
| 213 | frequency 3 coverage |
| 214 | frequency 4 coverage |
| 219 | overlap between 211 and 213 |
| 221 | transmitter 1 frequency 1 |
| 222 | transmitter 1 frequency 2 |
| 223 | transmitter 1 frequency 3 |
| 224 | transmitter 1 frequency 4 |
| 231 | transmitter 2 frequency 1 |
| 232 | transmitter 2 frequency 2 |
| 242 | transmitter 3 frequency 2 |
| 290 | receiver/mobile receiver/car |
| FIG. 3 | |
| 350 | interruption? |
| 360 | time $\geqq$ needed? |
| 370 | change reception frequency |
| 380 | test receive alternative frequency |
| 381 | optional: is there time for more test receptions? |
| 390 | enable reception of information flow |
| 391 | optional: more alternative frequencies to be tested |
| 392 | optional: evaluation of tested alternative freq. & possible handover |
| FIG. 4 | |
| 400 | reception |
| 410 | handover desired? |
| 420 | transfer routine closed? |
| 430 | change to test reception frequency |
| 440 | test receive |
| 450 | open transfer routine? |
| 460 | (change to) reception frequency |
| 470 | transfer routine closed? |
| 480 | handover |
| 490 | time-out? |

The invention claimed is:

1. A method of test receiving alternative reception frequencies in a receiver receiving a continuous flow of information of a unidirectional digital broadcasting transmission at a first reception frequency, the continuous flow of information including specific user terminating information transmitted in clusters, the receiver including an information transfer routine that extracts a flow of specific user terminating information from the received continuous flow of information, the method comprising:

predicting an interruption in the form of a natural break in the transmitted flow of specific user terminating information, based on an indication of the end of a cluster of the specific user terminating information, where the indication of the end of the cluster of specific user terminating information is part of the specific user terminating information;

evaluating the interruption to determine whether it will be of an adequate length of time, and generating a positive response if it is evaluated that the interruption will be of an adequate length of time;

changing the reception frequency of the receiver from the first reception frequency to an alternative reception frequency if the evaluation has generated a positive response;

test receiving the alternative reception frequency;

enabling reception and extraction of the flow of specific user terminating information.

2. The method according to claim 1, wherein the continuous flow of information is a terrestrial digital video broadcasting (DVB T) transmission.

3. The method according to claim 1, wherein the continuous flow of information is a digital audio broadcasting (DAB) transmission.

4. The method according to any one of claims 1 to 3, wherein evaluating the interruption comprises:

determining a probability that the interruption will be of an adequate length of time;

determining if the probability is larger than a predetermined threshold value; and if it is determined that the probability is larger than the predetermined threshold value then it is evaluated that the interruption will be of an adequate length of time.

5. The method according to claim 1, wherein an adequate length of time of an interruption is at least equal a total time required for one test reception and one frequency change.

6. The method according to claim 1, wherein predicting an interruption in the flow of specific user information comprises:

predicting an expected interruption in the flow of specific user information received in the receiver.

7. The method according to claim 1, wherein predicting an interruption in the flow of specific user information comprises:

receiving an indication by the information transfer routine.

8. The method according to claim 1, wherein predicting an interruption in the flow of specific user information comprises:

determining that an interruption in the flow of specific user information has occurred after a predetermined period of inactivity in the flow of specific user information.

9. The method according to claim 1, wherein predicting an interruption in the flow of specific user information comprises:

determining that an interruption in the flow of specific user information has occurred after a timeout signal is generated by the information transfer routine.

10. The method according to claim 1, wherein enabling reception and extraction of the flow of specific user terminating information is performed after the step of test receiving the alternative reception frequency has completed.

11. The method according to claim 1, wherein enabling reception and extraction of the flow of specific user terminating information is performed after a predetermined time interval from the point in time of the step of changing the reception frequency from the first reception frequency to an alternative frequency.

12. The method according to claim 1, wherein enabling reception and extraction of the flow of specific user terminating information is performed after a predicted available time period.

13. The method according to claim 1, wherein enabling reception and extraction of the flow of specific user terminating information is performed after the information transfer routine has requested more information.

14. The method according to claim 1, wherein enabling reception and extraction of the flow of specific user terminating information is performed a predetermined period of time after the information transfer routine has requested more information.

15. The method according to claim 1, wherein enabling reception and extraction of the flow of specific user terminating information is performed after the information transfer routine is activated.

16. The method according to claim 1, wherein enabling reception and extraction of the flow of specific user terminating information is performed a predetermined period of time after the information transfer routine is activated.

17. The method according to claim 1, further comprising: determining a list of alternative frequencies.

18. The method according to claim 17, wherein after the step of test receiving the alternative reception frequency the method further comprises:

changing the reception frequency of the receiver from an alternative reception frequency to a further alternative frequency from the list of alternative frequencies; and test receiving the further alternative frequency.

19. The method according to claim 18, wherein changing the reception frequency of the receiver from an alternative reception frequency to a further alternative frequency from the list of determined alternative frequencies, and test receiving the further alternative frequency are repeated by changing to alternative frequencies from the list of determined alternative frequencies.

20. The method according to claim 18, wherein changing reception frequency of the receiver from an alternative reception frequency to a further alternative frequency from the list of determined alternative frequencies, and test receiving the further alternative frequency are repeated by changing to alternative frequencies from the list of determined alternative frequencies, until all the frequencies from the list of determined alternative frequencies are test received.

21. The method according to claim 1, further comprising:

evaluating the test reception or test receptions based on one or more parameters of the test received alternative frequency or frequencies.

22. The method according to claim 1, wherein enabling reception and extraction of the flow of specific user terminating information comprises:

changing the reception frequency to the first reception frequency.

23. The method according to claim 1, further comprising:

initiating a handover to an alternative frequency.

24. The method according to claim 23, wherein initiating a handover comprises:

determining a handover frequency to which frequency the reception should be changed; and changing the reception frequency of the receiver to the handover frequency.

25. The method according to claim 24, wherein initiating a handover further comprises:

determining a further interruption in the flow of specific user terminating information;

evaluating the further interruption to determine whether it will be of an adequate length of time, and generating a positive response if it is evaluated that the further interruption will be of an adequate length of time; and wherein changing the reception frequency to the handover frequency only occurs if the evaluation of the further interruption has generated a positive response.

26. The method according to claim 25, wherein evaluating the further interruption comprises:

determining a probability that the further interruption will be of an adequate length of time;

determining if the probability is larger than a predetermined threshold value; and if it is determined that the probability is larger than the predetermined threshold value then it is evaluated that the further interruption will be of an adequate length of time.

27. The method according to claim 26, wherein an adequate length of time for the further interruption is at least equal a total time of one frequency change.

28. The method according to claim 1, wherein enabling reception and extraction of the flow of specific user terminating information comprises:

changing the reception frequency to one alternative reception frequency; and initiating a handover from the first reception frequency to the alternative reception frequency in question.

29. The method according to claim 1, wherein enabling reception and extraction of the flow of specific user terminating information comprises:

initiating a handover from the first reception frequency to the alternative reception frequency that was test received most recently.

30. A receiver configured to receive a continuous flow of information of a unidirectional digital broadcasting transmission at a first reception frequency, the continuous flow of information including specific user terminating information transmitted in clusters, the receiver comprising:

an antenna;

a demodulator; and a digital signal processing unit, the digital signal processing unit including an information transfer routine arranged to extract a flow of specific user terminating information from the received continuous flow of information, wherein the digital signal processing unit is configured to:

predict an interruption in the form of a natural break in the transmitted flow of specific user terminating information, based on an indication of the end of a cluster of the specific user terminating information, where the indication of the end of the cluster of specific user terminating information is part of the specific user terminating information;

evaluate if the predicted interruption will be of an adequate length of time;

change the reception frequency of the receiver from the first reception frequency to an alternative reception frequency if the interruption is of an adequate length of time;

test receive the alternative reception frequency; and enable reception and extraction of the flow of specific user terminating information.

31. The receiver according to claim 30, wherein the continuous flow of information is a terrestrial digital video broadcasting (DVB T) transmission.

32. The receiver according to claim 30, wherein the continuous flow of information is a digital audio broadcasting (DAB) transmission.

33. The receiver according to any one of claims 30 to 32, wherein the digital signal processing unit is further configured to:

determine a probability that the interruption will be of an adequate length of time;

determine if the probability is larger than a predetermined threshold value; and if it is determined that the probability is larger than a predetermined threshold value then it is evaluated that the interruption will be of an adequate length of time.

34. The receiver according to claim 30, wherein an adequate length of time for an interruption is at least equal a total time of one test reception and two frequency changes.

35. The receiver according to claim 30, wherein the digital signal processing unit is further configured to:

change the reception frequency to the first reception frequency.

36. The receiver according to claim 30, wherein the digital signal processing unit is further configured to:

initiate a handover from the first reception frequency to an alternative frequency.

37. The receiver according to claim 30, wherein the digital signal processing unit is further configured to:

initiate a handover from the first reception frequency to the alternative reception frequency that was test received most recently.

* * * * *